United States Patent [19]

Shoji

[11] 4,360,173

[45] Nov. 23, 1982

[54] MAGNETIC TAPE CASSETTE

[75] Inventor: Shigemasa Shoji, Tokyo, Japan

[73] Assignee: TDK Electronics Co., Ltd., Tokyo, Japan

[21] Appl. No.: 183,457

[22] Filed: Sep. 2, 1980

[30] Foreign Application Priority Data

Sep. 9, 1979 [JP] Japan .................. 54/124289[U]

[51] Int. Cl.³ .................. G03B 1/04; G11B 15/32; G11B 23/04
[52] U.S. Cl. .................. 242/199; 242/74
[58] Field of Search .................. 242/74.1, 74, 197–199; 29/563; 360/96; 132

[56] References Cited

U.S. PATENT DOCUMENTS 3,960,338  6/1976  Shapley .................. 242/74.1
4,096,538  6/1978  Oishi .................. 360/132

Primary Examiner—Leonard D. Christian
Attorney, Agent, or Firm—Oblon, Fisher, Spivak, McClelland & Maier

[57] ABSTRACT

A magnetic tape cassette includes a magnetic tape and two reels in a casing. The reel is formed by a reel substrate, a jaw and a tape clamping member. An exterior angle $\alpha$ between a prolonged line $D_1$ of a contact surface of the reel substrate and an axial line $E_1$ for dividing the tape clamping member into two half parts is less than 90 degrees.

6 Claims, 6 Drawing Figures

MAGNETIC TAPE CASSETTE

BACKGROUND OF THE INVENTION

1. Field of the Invention

The present invention relates to a magnetic tape cassette. More particularly, it relates to an improvement of a tape clamp of a reel for winding a magnetic tape.

2. Description of the Prior Art

As shown in FIG. 1, the magnetic tape cassette comprises a cassette casing formed by two half cases (1), (2) and a magnetic tape (3) and rotatable (4), (4) for winding the magnetic tape (3) which are held in the casing and sheets (5), (6) which are respectively placed between the inner wall surfaces (1a), (2a) of the half cases (1), (2) and the reels (4), (4) on which the magnetic tape is wound.

As shown in FIG. 2 (A) and (B), the reels (4), (4) are respectively formed by a reel substrate (7) and a jaw (8) and a tape clamping member (9) which is detachably fitted to the reel substrate (7), thereby forming a circular magnetic tape wound surface.

A leader part or a trailer part (3a) of the magnetic tape (3) is held between contacting surfaces of the reel substrate (7) and the tape clamping member (9) under the high mutual pressure of them.

Thus, in the conventional reel (4), an exterior angle $\alpha$ between a line extending from $D_1$ of a contact surface of the jaw (8) and an axial line $E_1$ for dividing the tape clamping member (9) into two half parts is an obtuse angle which is larger than a right angle (90 degrees). Therefore, the clamping force on the contact surface $D_1$ of the jaw (8) is not high enough. As shown in FIG. 2B, when a certain clamp releasing force $F_1$ to the radial direction is applied to the tape clamping member (9), the contact surface of the jaw (8) slips in the radial direction so as to be easily detached.

SUMMARY OF THE INVENTION

It is an object of the present invention to provide a magnetic tape cassette which comprises a reel having a large clamping force great enough to prevent easy slip-out of the magnetic tape from a tape clamping member.

The foregoing and other objects of the present invention have been attained by providing a magnetic tape cassette comprising a magnetic tape and two reels for winding the magnetic tape which are held in a casing wherein the reel is formed by a reel substrate, a jaw and a tape clamping member which is detachably fitted to the reel substrate and the jaw is formed to give less than right angle for an exterior angle between a prolonged line of the contact surface of the jaw and an axial line for dividing the tape clamping member into two symmetrical half parts.

DETAILED DESCRIPTION OF THE PREFERRED EMBODIMENT

Figure 3:
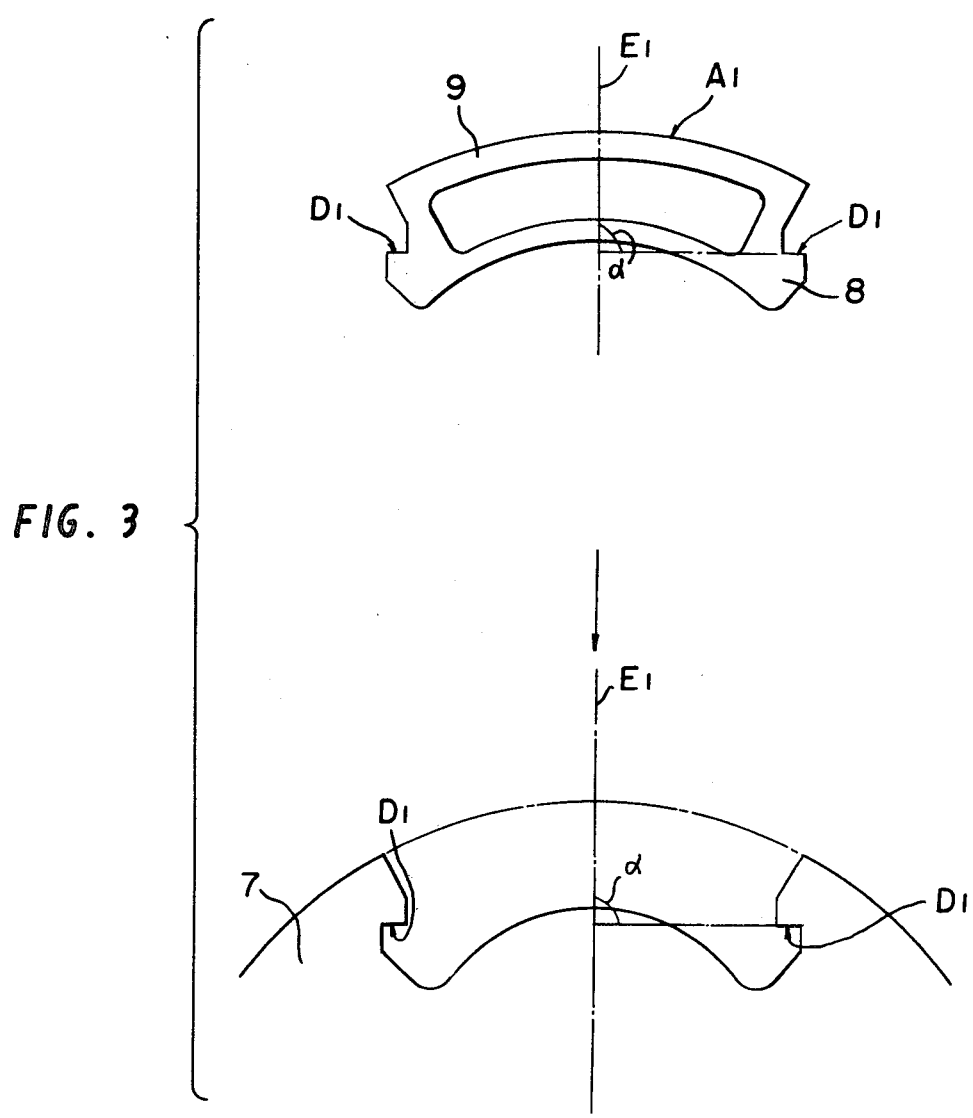
FIG. 3 is an exploded view of a part of the reel used in the magnetic tape cassette of the present invention.
Figure 4A:
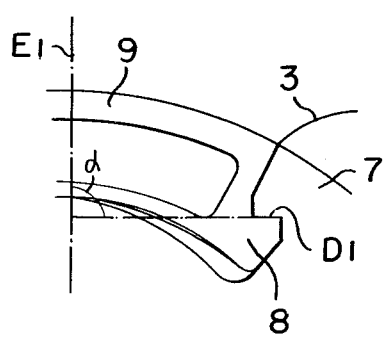
FIGS. 4A and 4B shows a part of the reel for illustrating the effect of the present invention.
Figure 4B:
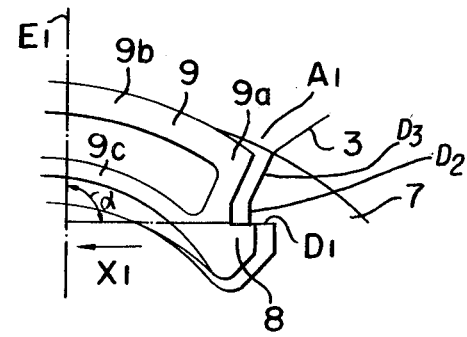

Referring to FIGS. 3, 4A, and 4B one embodiment of the magnetic tape cassette of the present invention will be discussed.

Figure 1:
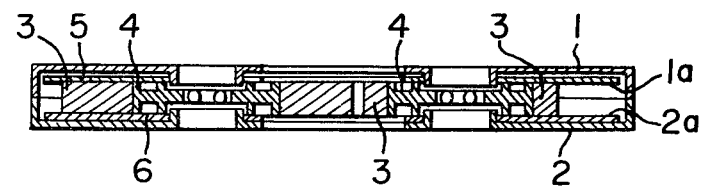
FIG. 1 is a sectional view of a conventional magnetic tape cassette.
Figure 2A:
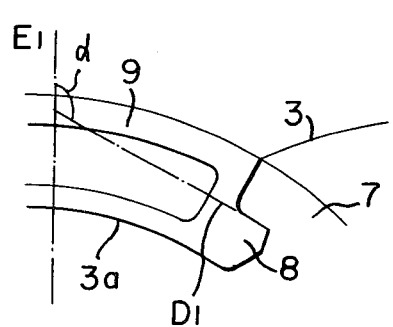
FIGS. 2A and 2B shows a conventional magnetic tape cassette.
Figure 2B:
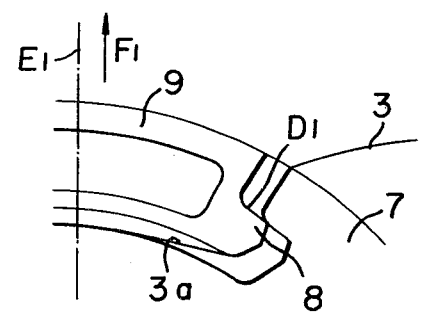

FIG. 3 is an exploded view of a part of the reel used in the present invention. In FIG. 3, the same references designate identical or corresponding parts having the same function as those of FIG. 2. As shown in FIG. 3, the basic structure of the reel of the present invention is not substantially different. The reel of the present invention comprises the reel substrate (7), the jaw (8) and the tape clamping member (8) which is detachably fitted to the reel substrate (7) and the circular magnetic tape wound surface is formed on the reel.

The important characteristic is to provide less than a right angle for the exterior angle $\alpha$ between the prolonged line $D_1$ of the contact surface of the jaw (8) of the tape clamping member (9) and the coacting surface formed within the reel substrate (7) and the axial line $E_1$ for dividing the tape clamping member (9) into two half parts symmetric about line $E_1$. In the structure fitting the tape clamping member (9) to the reel substrate (7) in the above-mentioned relation, when the magnetic tape (3) clamped between the contact surfaces of the tape clamping member (9) and the reel substrate (7) as shown in FIG. 4A is pulled under a tensile force, the jaw (8) of the tape clamping member (9) is moved to slide in the direction which is substantially perpendicular to the axial line of symmetry $E_1$ along the contact or engaging surface $D_1$ of the reel substrate (7) and the coacting surface of the reel substrate shown in FIG. 4B, whereby the external end (9a) of the tape clamping member (9) is deformed to be bent inwardly from the external peripheral line $A_1$. Also shown are contact surfaces $D_2$ and $D_3$ of reel substrate (7) such that each of surfaces $D_1$, $D_2$ and $D_3$ form an angle with respect to one another as shown in FIGS. 4A and 4B. The deformations of the external rib (9b) and the internal (9c) of the reel clamping member (9) are increased whereby the magnetic tape (3) is clamped without failure under high clamping force until the reel clamping member (9) is detached from the reel substrate (7).

In accordance with the magnetic tape cassette of the present invention, the reel has the structure in which the exterior angle between the line extending from the contact surface of the reel substrate and the axial line of symmetry for dividing the tape clamping member into two half parts is less than 90 degrees whereby the magnetic tape cassette having high reliability and high tape clamping force without easy slip-out of the magnetic tape is provided.

I claim:

1. A magnetic tape cassette comprising:
a magnetic tape and first and second reels for winding said magnetic tape which are held in a casing wherein each of said reels further comprises a reel substrate, a detachable tape clamping member having a first arcuate, radially internal rib and a second arcuate, radially external rib and which is detachably fitted to said reel substrate, wherein said tape clamping member further comprises a first and second jaw for engaging said reel substrate and wherein an exterior angle between a prolonged line of a contact surface of said jaw and an axial line of symmetry dividing said tape clamping member into two parts is less than 90 degrees on said jaw.

2. A magnetic tape cassette as set forth in claim 1, wherein said first and second jaw are of substantially identical shape.

3. A magnetic tape cassette as set forth in claim 1, wherein said reel substrate includes a first, second and third pair of surfaces for contacting said tape clamping member wherein each of said surfaces forms an angle with respect to the remaining surfaces.

4. A magnetic tape cassette as set forth in claim 1, wherein said clamping member further comprises a symmetrical clamping member such that said axial line divides said tape clamping member into said two parts symmetric with respect to each other about said axial line.

5. A magnetic tape cassette as set forth in claim 1, wherein said radially external rib and said reel substrate form a substantially continuous outer peripheral curved surface upon attachment of said clamping member to said reel substrate.

6. A magnetic tape cassette as set forth in claim 1, wherein said first jaw further comprises a first contact surface, said second jaw further comprises a second contact surface, and said reel substrate further comprises first and second engaging surfaces for coacting with said first contact surface and said second contact surface, respectively, such that clamping of said magnetic tape is effected between said first contact surface and said first engaging surface and between said second contact surface and said second engaging surface over substantial surface portions of said magnetic tape.

* * * * *